(12) United States Patent  (10) Patent No.: US 8,985,661 B2
Müller et al.                (45) Date of Patent:     Mar. 24, 2015

(54) DEVICE HAVING A PLASTIC MOLDED PART AND A COVER

(75) Inventors: Gerhard Müller, Selb (DE); Christian Lemm, Aidlingen (DE)

(73) Assignee: Rehau AG + Co, Rehau (DE)

( * ) Notice: Subject to any disclaimer, the term of this patent is extended or adjusted under 35 U.S.C. 154(b) by 299 days.

(21) Appl. No.: 13/202,769

(22) PCT Filed: Feb. 23, 2010

(86) PCT No.: PCT/EP2010/001102
§ 371 (c)(1),
(2), (4) Date: Aug. 23, 2011

(87) PCT Pub. No.: WO2010/097193
PCT Pub. Date: Sep. 2, 2010

(65) Prior Publication Data
US 2011/0304168 A1     Dec. 15, 2011

(30) Foreign Application Priority Data
Feb. 27, 2009  (DE) ............... 20 2009 002 796 U

(51) Int. Cl.
*B60R 13/02*  (2006.01)
*B60R 19/02*  (2006.01)
*B60R 19/18*  (2006.01)

(52) U.S. Cl.
CPC ....... *B60R 19/023* (2013.01); *B60R 2019/1886* (2013.01)
USPC ................................... 296/1.08; 296/193.01

(58) Field of Classification Search
USPC ............... 296/193.01, 1.08, 1.06; 293/149
IPC ...................................... B60R 19/48
See application file for complete search history.

(56) References Cited

U.S. PATENT DOCUMENTS 6,830,274 B2 *  12/2004  Burkhardt et al. ........... 296/1.06

FOREIGN PATENT DOCUMENTS

| DE | 43 42 981 A1 | 7/1994 |
| DE | 102 03 416 A1 | 7/2003 |
| DE | 103 40 154 A1 | 3/2005 |
| DE | 10 2006 054 618 A1 | 5/2008 |
| EP | 1 067 025 A1 | 1/2001 |
| EP | 1 512 582 A1 | 3/2005 |

OTHER PUBLICATIONS

International Search Report.

* cited by examiner

*Primary Examiner* — Pinel Romain
(74) *Attorney, Agent, or Firm* — Da Vinci Partners LLC; John Moetteli

(57) ABSTRACT

A device, having a plastic molded part (1), in particular an add-on part and/or trim part for a motor vehicle, comprises a cover (2) for closing an opening (3) in a wall (4) of the plastic molded part (1). The cover (2) has a first rim (6) and a second rim (7), substantially opposite of the first rim (6), wherein the cover (2) has at least one retaining hook (9), which engages behind the opening (3) in the closed position of the cover (2), on the inner side (8) facing the opening (3) in the region of the first rim (6), and the cover (2) further has at least one detent element (10) on the inner side (8) in the region of the second rim (7), said detent element being latched in the closed position of the cover (2) to at least one detent counter element (11), fixedly attached to the wall (4). The cover (2) has at least one further additional detent element (12) on the inner side (8) in the region of the first rim (6), said element interacting with at least one additional detent counter element (13) at the wall (4), so that the cover (2) is held in the closed position at least substantially without prestress with respect to the opening (3).

17 Claims, 7 Drawing Sheets

DEVICE HAVING A PLASTIC MOLDED PART AND A COVER

This application is the National Stage of International Application No. PCT/EP2010/001102, filed Feb. 23, 2010, which claims benefit under 35 USC §119(a), to German patent application Ser. No. 20 2009 002 796.1, filed Feb. 27, 2009.

The invention relates to a device having a plastic molded part, in particular an add-on part or trim part for a motor vehicle, comprising a cover for closing an opening in a wall of the plastic molded part, wherein the cover inserted into the opening can assume a closed position in which it closes the opening and an open position in which it can be removed from the opening and/or can be inserted therein, wherein the cover has a contour which is substantially formed complementary to the opening so that the cover substantially fills the opening in the closed position, wherein the cover has a first rim and a second rim substantially opposite of the first rim, wherein the cover has at least one retaining hook which is arranged in the region of the first rim on the cover's inner side facing the opening and which engages behind the opening in the closed position of the cover, wherein the cover further has at least one detent element which is arranged on the cover's inner side in the region of the second rim and which, in the closed position of the cover, is latched to at least one detent counter element fixedly attached to the wall.

DE 102 03 416 B4 discloses a cover for closing an opening formed in a wall of trim part of a motor vehicle. The circumferential contour of the closure cover is adapted to the cut-out of the trim part. The cover-wall arrangement described further discloses that the cover is easily insertable and removable via guiding contours and, in particular, the risk of damage to the wall and/or the cover when pivoting the cover between a closed and an open position is reduced.

Furthermore, from DE 43 42 981 A1, a bumper cover is known which has an opening for a detachable trailer coupling and a lid covering the opening when the trailer coupling is detached. In the closed state, the lid is integrated in the outer contour of the bumper such that it is largely flush with the surface, wherein, on the opposite side, the lid is latched via clip hooks to a frame fastened to the inner side of the bumper. For releasing the latching, the lid is provided on its circumference with at least one slot in which the blade of a tool can engage for the purpose of pushing down the associated clip hook. In case of a painted bumper, it is intended to permit painting of the frame and lid at the same time when the lid is kept, by means of an auxiliary device, at a fixed distance from the frame, and thus is not in the closed position in the opening of the bumper.

The disadvantage of the prior art is that the cover has to be opened by means of a tool, or, respectively, that the cover may not remain in its closed position within the opening when the bumper is exposed to heat during the painting process.

Against this background, an object of the invention is to provide a device with the above-described features which allows an easy assembly and disassembly of the cover, and whereby the cover is held in its closed position in the opening in such a manner that a painting process has no negative influence on the fastening elements of the cover.

According to the invention, this object is achieved in that the cover has at least one further additional detent element on its inner side in the region of the first rim, which additional detent element interacts with at least one additional detent counter element on the wall, and thus the cover is held in the closed position at least substantially without prestress with respect to the opening. The cover preferably involves a plastic cover. Holding or fixing the cover without prestress with respect to the opening offers the advantage that, in particular, during the curing or baking process of a top coat (a base, primer and paint coats) required for the optical and aesthetic appeal, the cover cannot loosen in its closed position under the influence of the high temperatures of the painting process. The material- and temperature-dependent loss of prestressing force of the cover's fastening elements resulted previously in a loosening of the cover or a disturbing noise generation during the operation of the motor vehicle. The device according to the invention permits the holding of the cover in its closed position in the opening in such a manner that a painting process has no negative influence on the fastening of the cover. Advantageously, in its closed position and fully assembled together with the plastic molded part, the cover can be provided with a preferably colored top coat. A subsequent assembly step or a complicated and cost-intensive separate painting of cover and plastic molded part can therefore be eliminated using the device according to the invention. In addition, it is ensured that no differences with respect to color-related or visual appeal of the top coat exist because the cover and the plastic molded part have an identical structure in the top coat. Preferably, the cover is therefore made from the same material as the plastic molded part.

The detent element can be formed in such a manner that upon action of a force, only the detent element yields and unlatches from the detent counter element. However, according to the invention, it is also possible that the detent element is formed substantially rigid and the detent counter element is formed such that the same yields when a force is applied and the detent element unlatches from the detent counter element. Within the context of the invention, the detent element as well as the detent counter element can be formed in such a manner that they yield under the action of a force and the detent element unlatches from the detent counter element. Similarly, it is also possible that the additional detent element and/or the additional detent counter element are/is formed in such a manner that they/it yield/yields and the additional detent element unlatches from the additional detent counter element.

For assembling the cover, preferably, a lower force is required than for disassembling. A low required force during assembly allows an easy, cost-effective and fast assembly of the cover. The force for disassembly which, according to the invention, is higher, ensures against unintended release of the cover from the wall of the plastic molded part. Although the cover requires a force for disassembly which is higher with respect to the force for assembly, according to the invention, the use of tools during disassembly is no longer required. In addition, no recess for such a tool has to be provided on the outside so that no optical impairment of the otherwise flush outer surface of the cover-wall arrangement is apparent.

In the closed position of the cover, the additional detent counter element can serve as a limit stop for the additional detent element. The additional detent element can be formed such that in the closed position of the cover, said additional detent element first rests against the additional detent counter element and unlatches from the additional detent counter element only upon the action of a sufficient pressure force. This ensures, in an advantageous manner, that in case of a correspondingly lower force, the cover initially remains exactly positioned in its closed position. Only after a targeted opening process with a sufficient application of force, does the additional detent counter element yield so that the additional detent element can unlatch and release the cover into the open position. According to the invention, it is also possible that the additional detent element is formed such that in case of a sufficient force, the additional detent element yields so that the additional detent element can unlatch and release the cover into the open position.

Preferably, the retaining hook, the detent element and the additional detent element are formed in such a manner that they jointly fix the cover in the closed position with slight play with respect to the wall. The retaining hooks and the additional detent element can be adjusted with respect to each other in such a manner that the retaining hooks engage behind the wall's opening in the closed position of the cover and, at the same time, the additional detent element rests against the limit stop of the additional detent counter element in such a manner that in the region of the first rim, the cover is fixed with slight play in the opening. In the region of the second rim, the detent element can be formed in such a manner that it interacts in the closed position of the cover with the detent counter element and a support surface of the wall of the plastic molded part in such a manner that in the region of the second rim, in the latching position (closed position of the cover) of the detent element, the cover is fixed with slight play in the opening.

The detent element and the additional detent element can be formed in such a manner that during the opening process of the cover, the detent element unlatches only after the additional detent element or at the same time as the additional detent element. Only then, is the cover released in the open position. Since during assembly of the cover, only the detent element or the detent counter element has to yield or deflect, the force for assembly is correspondingly lower than for disassembly. During disassembly, the detent element and the additional detent counter element (and/or the detent counter element and the additional detent element) can jointly yield upon application of a force onto the cover. The sufficient pressure force acting during disassembly on the cover for an opening process reaches a correspondingly higher value than the pressure force required during assembly of the cover.

The first rim of the cover preferably has a plurality of retaining hooks which, more preferably, are arranged equally spaced with respect to each other. Through the multitude of retaining hooks, inserting the cover into the opening is facilitated and, advantageously, the cover is fixed or positioned at a plurality of positions in relation to the opening.

Preferably, the cover additionally has at least one centering element on its inner side, which centering element interacts with the opening and/or with at least one centering counter element in the region of the opening. The centering element facilitates the assembly process of the cover from the open position into its final closed position.

Advantageously, the cover can additionally comprise a retaining lanyard molded thereon which can be connected to the wall in a captive manner. Said retaining lanyard ensures that in the open position, the cover remains connected to the wall in such a manner that the cover can not get lost.

At its end faces away from the cover, the retaining lanyard can have a clip element or a snap element which interacts with a corresponding receptacle on the wall so as to connect the retaining lanyard to the wall. The clip element or the snap element can be integrally molded on the retaining lanyard. The clip element or the snap element ensures a fast and simple connection of the retaining lanyard and the wall of the plastic molded part. Preferably, the clip element or the snap element is integrally molded on the retaining lanyard.

Preferably, the detent element and/or the retaining hook and/or the additional detent element and/or the centering element and/or the retaining lanyard are integrally molded on the cover. More preferably, the cover is formed as a plastic injection molded part.

The detent counter element and/or the additional detent counter element and/or the centering counter element and/or the receptacle can likewise be integrally molded on the wall of the plastic molded part. Preferably, the plastic molded part is formed as a bumper trim part or as a fender of a motor vehicle and more preferably, is formed as a plastic injection molded part.

The cover and the plastic molded part can comprise at least one top coat. The top coat preferably comprises at least one paint coat and/or at least one base coat and/or at least one primer coat. More preferably, the application of the top coat onto the cover takes place together with the application of the same top coat onto the plastic molded part, wherein the cover is in its closed position and located in the opening of the plastic molded part. The device according to the invention ensures that during the curing or baking process, the cover is held without prestress with respect to the opening. Prior to applying the top coat, the cover and the plastic molded part can be subjected to a pre-treatment for activating the surface, preferably a plasma pre-treatment and/or corona pretreatment and/or flame impingement.

A method with a device according to any one of the claims 1 to 14 comprises the following steps:

Inserting the cover into the opening in the wall of the plastic molded part, in particular an accessory and/or trim part for a motor vehicle.

Closing the opening in the wall of the plastic molded part with the cover.

Activating the surface of cover and plastic molded part, preferably by means of a flame impingement and/or a plasma pre-treatment and/or corona pre-treatment.

Applying a top coat onto the plastic molded part and the cover, wherein the top coat comprises a primer coat and/or a base coat and/or a colored paint coat and/or a clear lacquer coat.

Curing or baking the top coat and, preferably, a final quality control.

EXEMPLARY EMBODIMENT

The invention is explained hereinafter by means of a drawing only illustrating an exemplary embodiment. In the figures, schematically:

In the figures, identical or functionally identical elements are indicated with the same reference numbers.

Figure 1:
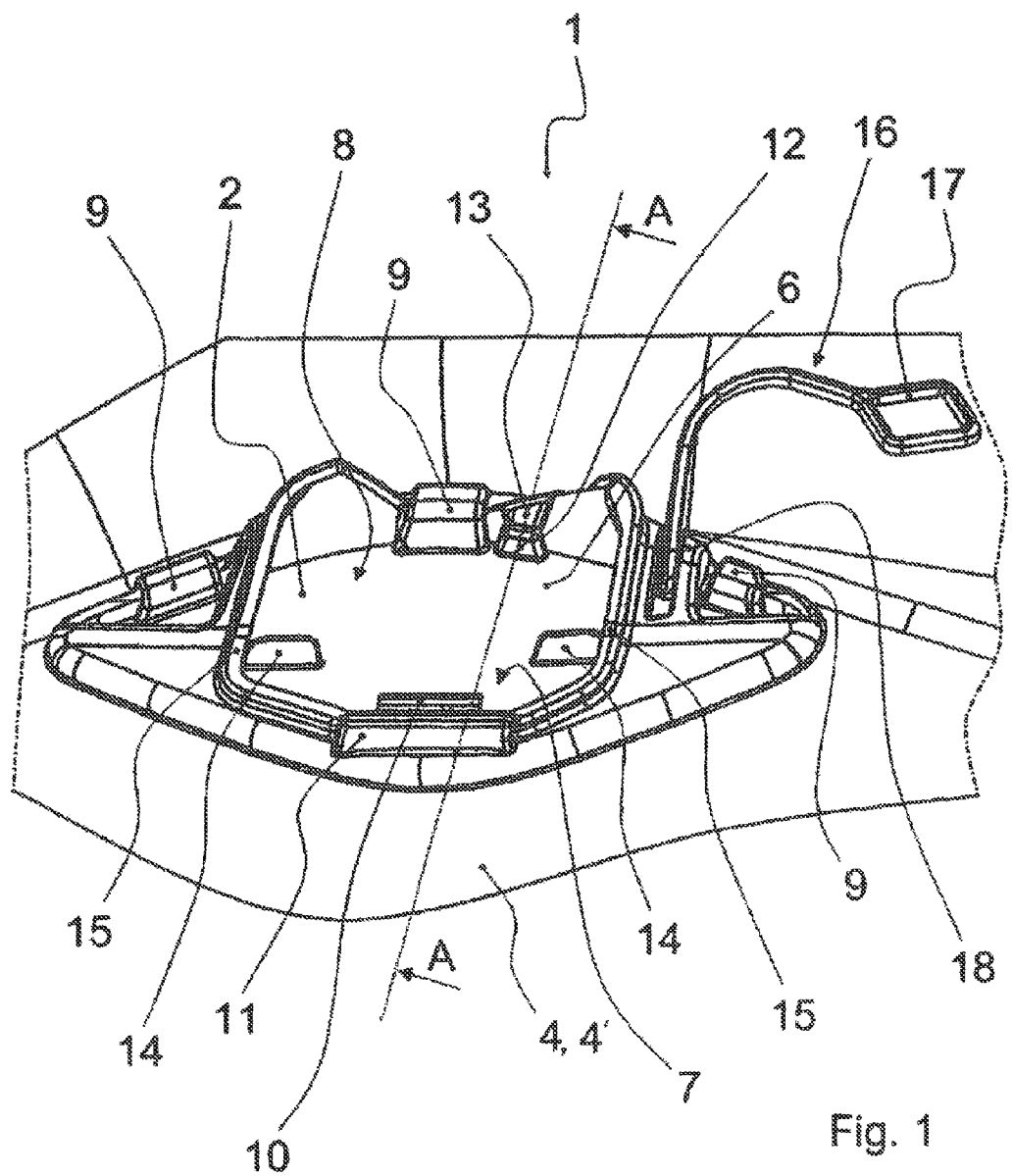
FIG. 1 shows an interior view of the device according to the invention with the cover in its closed position within the opening of the plastic molded part.

FIG. 1 shows a device with a plastic molded part 1, in particular an accessory and/or trim part for a motor vehicle, comprising a cover 2 for closing an opening 3 in a wall 4 of the plastic molded part 1. The cover 2 inserted into the opening 3 is in its closed position in which the cover closes the opening 3. In the open position, which is not shown in detail, the cover can be removed from the opening 3 and/or can be inserted therein. Furthermore, the cover 2 has a contour which is formed substantially complementary to the opening 3 so that in the closed position, the cover 2 substantially fills the opening 3. The cover further has a first rim 6 and a second rim 7 substantially opposite of the first rim 6. On its inner side 8 facing toward the opening 3, in the region of the first rim 6, the cover 2 has a plurality of retaining hooks 9 which engage behind the opening 3 in the closed position of the cover 2. Further, on its inner side 8, in the region of the second rim 7, the cover has a detent element 10 which is latched in the closed position of the cover 2 to a detent counter element 11 fixedly attached to the wall 4. According to the invention, the cover 2 has a further additional detent element 12 on its inner side 8 in the region of the first rim 6, which further additional detent element interacts with an additional detent counter element 13 on the wall 4. The cover 2 is held in its closed position without prestress with respect to the opening 3.

In addition, the cover has a retaining lanyard 16 which is molded on the cover and is captively connected to the wall 4. At its end facing toward the cover 2, the retaining lanyard 16 has a clip element 17 which interacts with a corresponding receptacle 18 on the wall 4 so as to connect the retaining lanyard 16 to the wall 4. Furthermore, on its inner side 8, the cover 2 has in addition two centering elements 14 which interact with the opening 3 or the centering counter element 15 in the region of the opening 3. The detent element 10, the retaining hooks 9, the additional detent element 12 and the centering element 14 as well as the retaining lanyard 16 are integrally molded on the cover 2 using a plastic injection molding method. The detent counter element 11, the additional detent counter element 13, the centering counter element 15 and the receptacle 18 are likewise integrally molded on the wall 4 of the plastic molded part 1 using a plastic injection molding method. In the illustrated exemplary embodiment, the plastic molded part 1 is formed as a bumper trim part. Said opening 3 preferably serves to permit access through the bumper trim part (plastic molded part 1) to a towing device, which is not illustrated here in detail, in particular to a towing eye or a tow hook.

Figure 2:
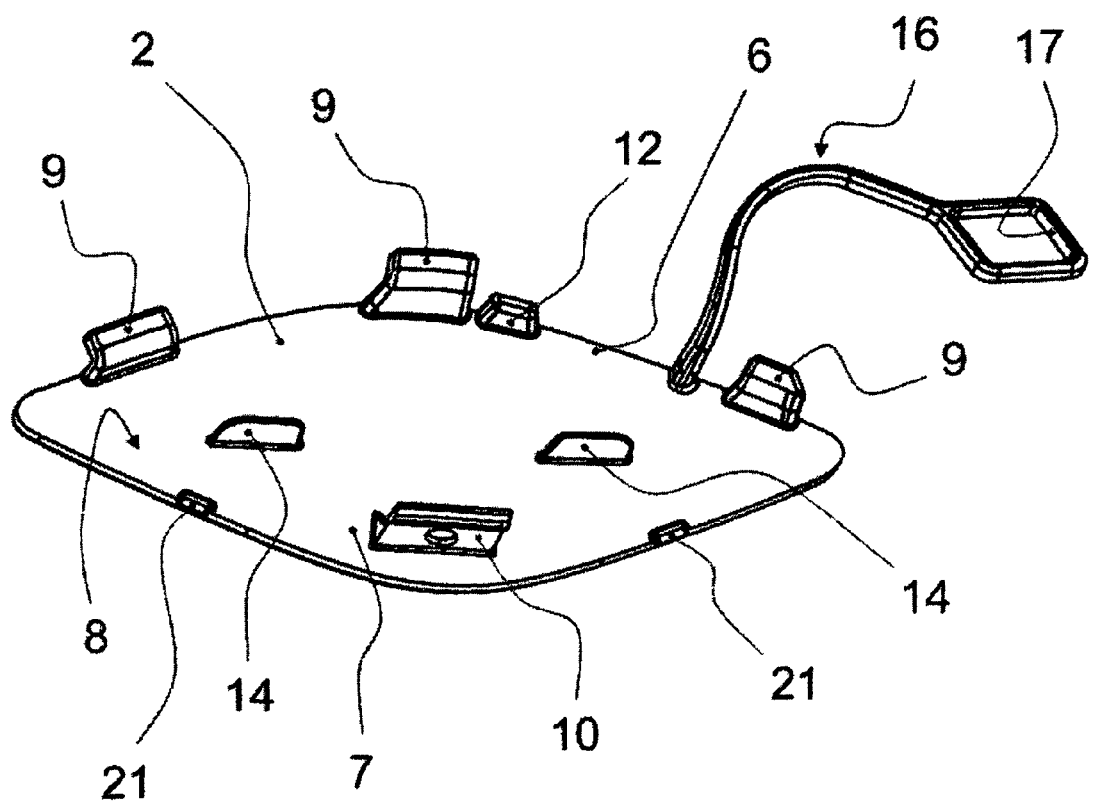
FIG. 2 shows an exterior view of a cover according to the invention.

The interior view 8 of the cover 2 illustrated in FIG. 2 shows the cover's 2 side facing toward the opening 3 in the closed position. The first rim 6 has a plurality of retaining hooks 9 which are arranged substantially equally spaced with respect to each other. Furthermore, the cover 2 has additional spacers 21 which keep the cover 2 in the closed position equally spaced from the contour of the opening 4 of the plastic molded part 1. Said spacers 21 protrude laterally beyond the inner side 8 of the cover 2 and, in the closed position, provide for a uniform gap dimension between cover 2 and plastic molded part 1. In the illustrated exemplary embodiment, the spacers 21 are integrally molded in the region of the second rim 7; however, it is also possible that the spacers 21 are integrally molded on the first rim 6 or that the first rim 6 as well as the second rim 7 have one or a plurality of spacers 21.

Figure 3:
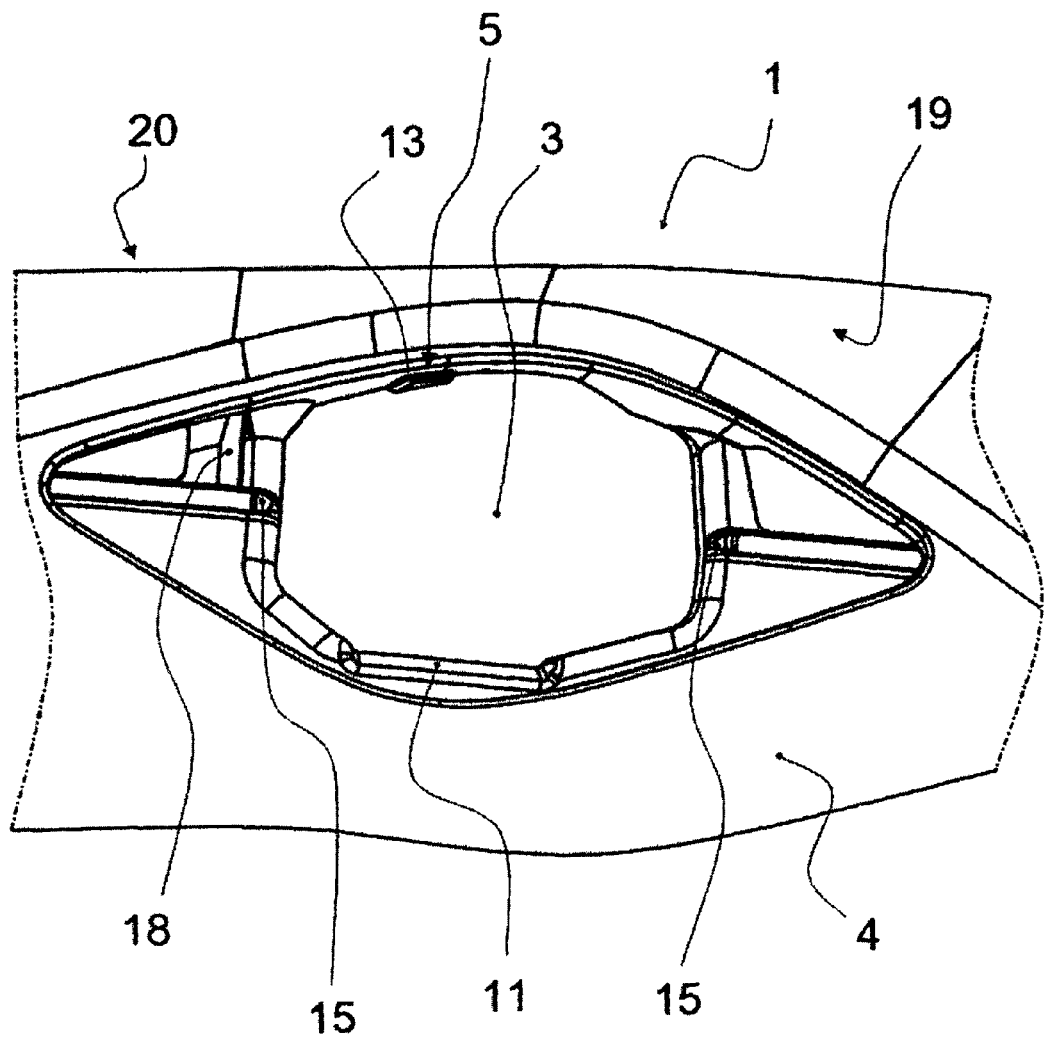
FIG. 3 shows a plastic molded part according to the invention having an opening.

FIG. 3 shows an exterior view 20 of a plastic molded part 1 which has an opening 3, wherein no cover is inserted in the opening 3. In this exemplary embodiment, the plastic molded part 1 is a fender of a motor vehicle 4'. In the region of the opening 3, two centering counter elements 15 are shown which interact with the centering elements 14 of the cover 2 which are not illustrated here. The additional detent counter element 13 is formed in such a manner that, in the closed position of the cover 2, it also serves as limit stop 5 for the additional detent element 12 (not shown here) of the cover 2. The plastic molded part 1 or the wall 4 has a top coat 19 on the outer side. A snap element 17 of the retaining lanyard 16 of the cover 2 is inserted in the receptacle 18 shown, and thus connects the retaining lanyard 16 to the wall 4 of the plastic molded part 1.

Figure 4:
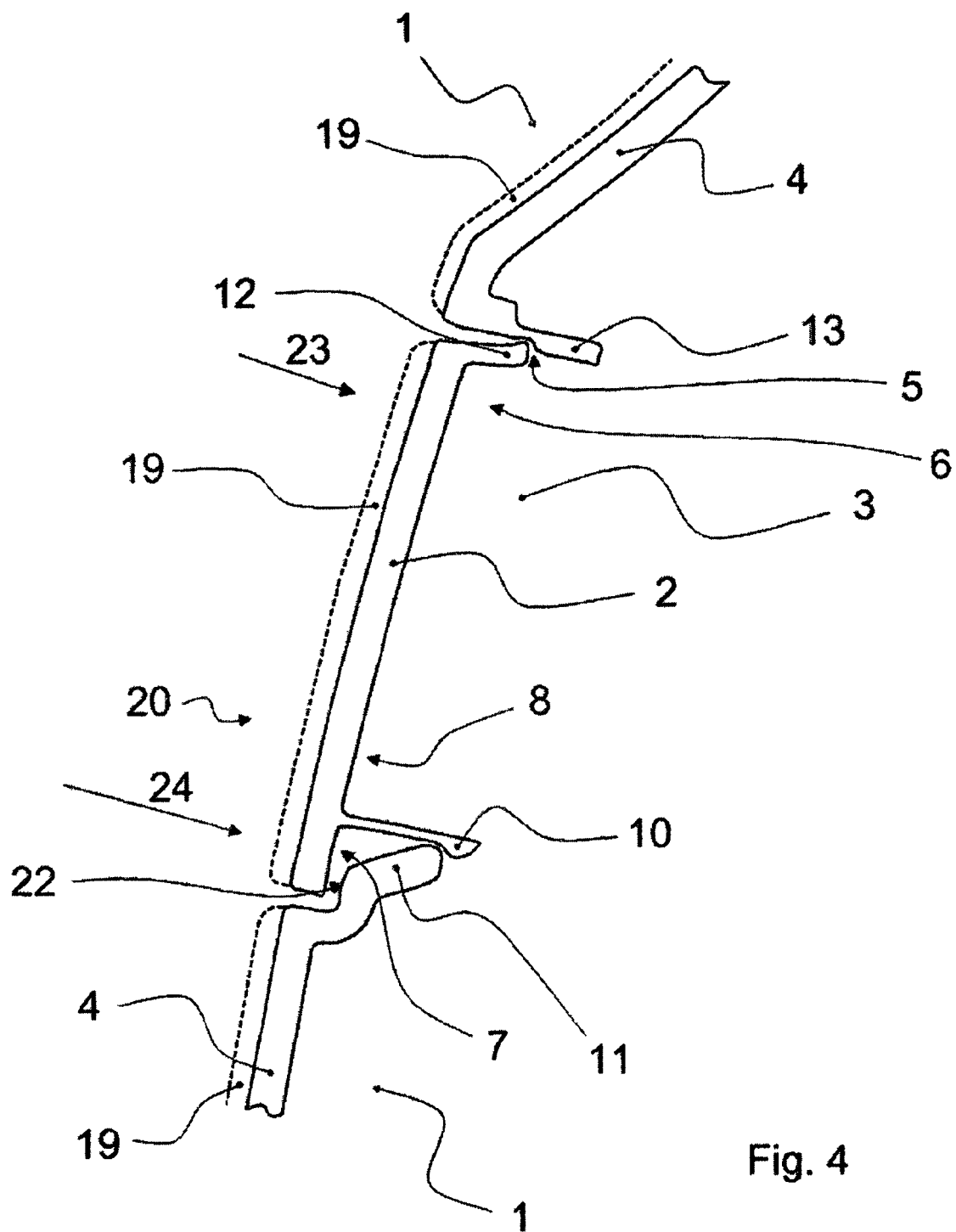
FIG. 4 shows a sectional view along the section line A-A in FIG. 1.

The section taken along the section line A-A of FIG. 1 illustrated in FIG. 4 shows the cover 2 in its closed position within the opening 3 in the wall 4 of the plastic molded part 1. In the region of the first rim 6, on its inner side 8, the cover has an additional detent element 12 which interacts with an additional detent counter element 13 of the wall 4 of the plastic molded part 1. In the region of the second rim 7, a detent element 10 is arranged which interacts with a detent counter element 11 of the wall 4 or the plastic molded part 1. On the outer side 20 visible to a user, the plastic molded part 1 as well as the cover 2 have a top coat 19. In this case, the top coat 19 is formed from a base coat or a primer coat as well as a colored paint coat and a clear lacquer coat. The individual coats of the top coat 19 on the plastic molded part 1 and the cover 2 were applied while the cover 2 was in the closed position within the opening 3. Advantageously, the cover 2 and the plastic molded part 1 therefore have the same top coat structure on their respective outer sides so as to integrate the cover 2 in its closed position both optically and haptically in the wall 4. It is further apparent from FIG. 4 that the second rim 7 of the cover 2 is supported on a support surface 22 of the wall 4 when a pressure force 24 acts in the region of the second rim 7 on the outer side 20 of the cover 2. Through a pressure force 23 acting on the outer side 20 in the region of the first rim 6 of the cover 2, the additional detent counter element 13 serves initially as limit stop 5 for the additional detent element 12. Only after exceeding a sufficient pressure force 23, the additional detent counter element 13 yields and the additional detent element 12 can unlatch so that the cover 2 pivots in the region of the first rim 6 into the opening 3.

Figure 5:
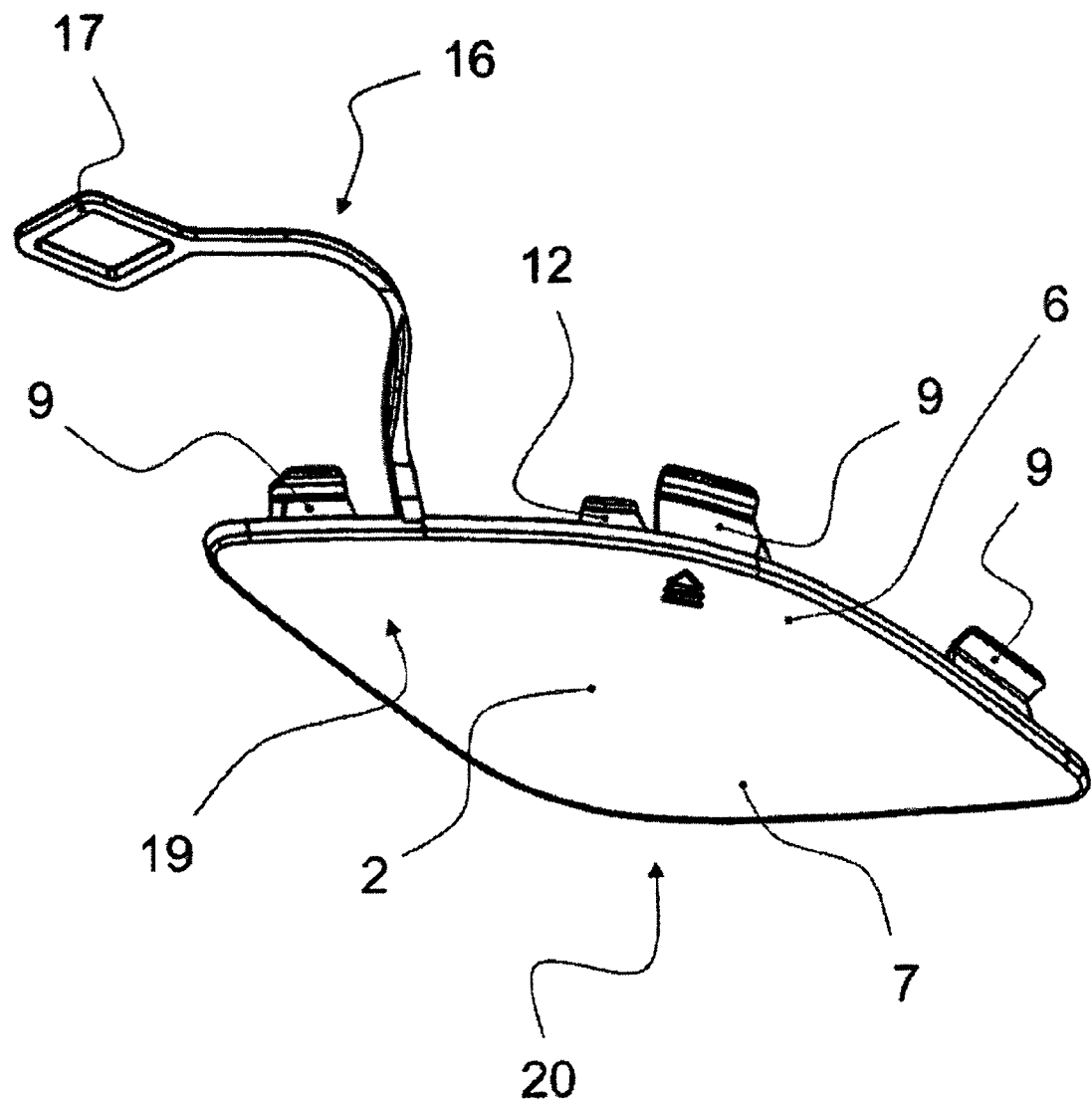
FIG. 5 shows an exterior view of the cover according to the invention.

The exterior view 20 of the cover 2 of the device illustrated in FIG. 5 clarifies again in detail the arrangement of the retaining hooks 9 and the additional detent element 12. The retaining hooks 9, the detent element 10 and the additional detent element 12 are formed in such a manner that they jointly fix the cover 2 in the closed position with slight play with respect to the wall 4 (not shown here). The retaining elements 9 and the additional detent element 12 are adjusted with respect to each other in such a manner that in the closed position of the cover 2, the retaining hooks 9 engage behind the opening 3 of the wall 4 and, at the same time, the additional detent element 12 rests against the limit stop 5 of the additional detent counter element 13 so that in the region of the first rim 6, the cover 2 is fixed with slight play in the opening 3. In the region of the second rim 7, the detent element 10 is formed such that in the closed position of the cover 2, said detent element and the detent counter element 11 and the support surface 22 are adjusted with respect to each other in such a manner that in the latching position (closed position of the cover) of the detent element 10, the cover is fixed in the region of the second rim 7 with slight play in the opening 3. According to the invention, the cover 2 is therefore held in the closed position substantially without prestress with respect to the opening 3.

Figure 6:
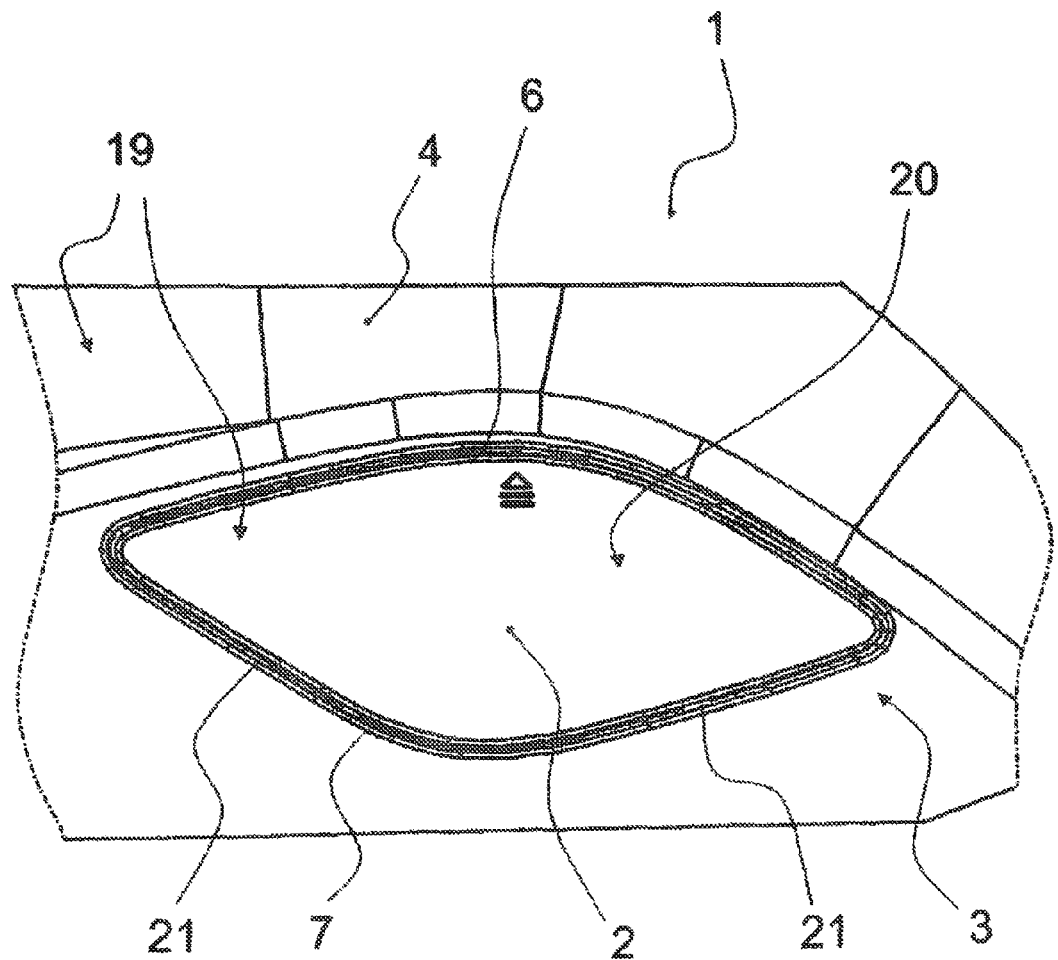
FIG. 6 shows an exterior view of the device according to the invention with the cover in its closed position within the opening of the plastic molded part.

FIG. 6 shows an exterior view 20 of the cover 2 and the wall 4 of the plastic molded part 1, wherein the cover 2 is in its closed position within the opening 3 in the wall 4 of the plastic molded part 1 so that the cover 2 substantially fills the opening 3. The two spacers 21 in the region of the second rim 7 allow maintaining an exact and uniform gap size between the plastic molded part 1 and the cover 2. The cover 2 and the plastic molded part 1 have a top coat 19 which was applied onto the cover 2 and the plastic molded part 1 in the closed position of the cover 2.

Figure 7:
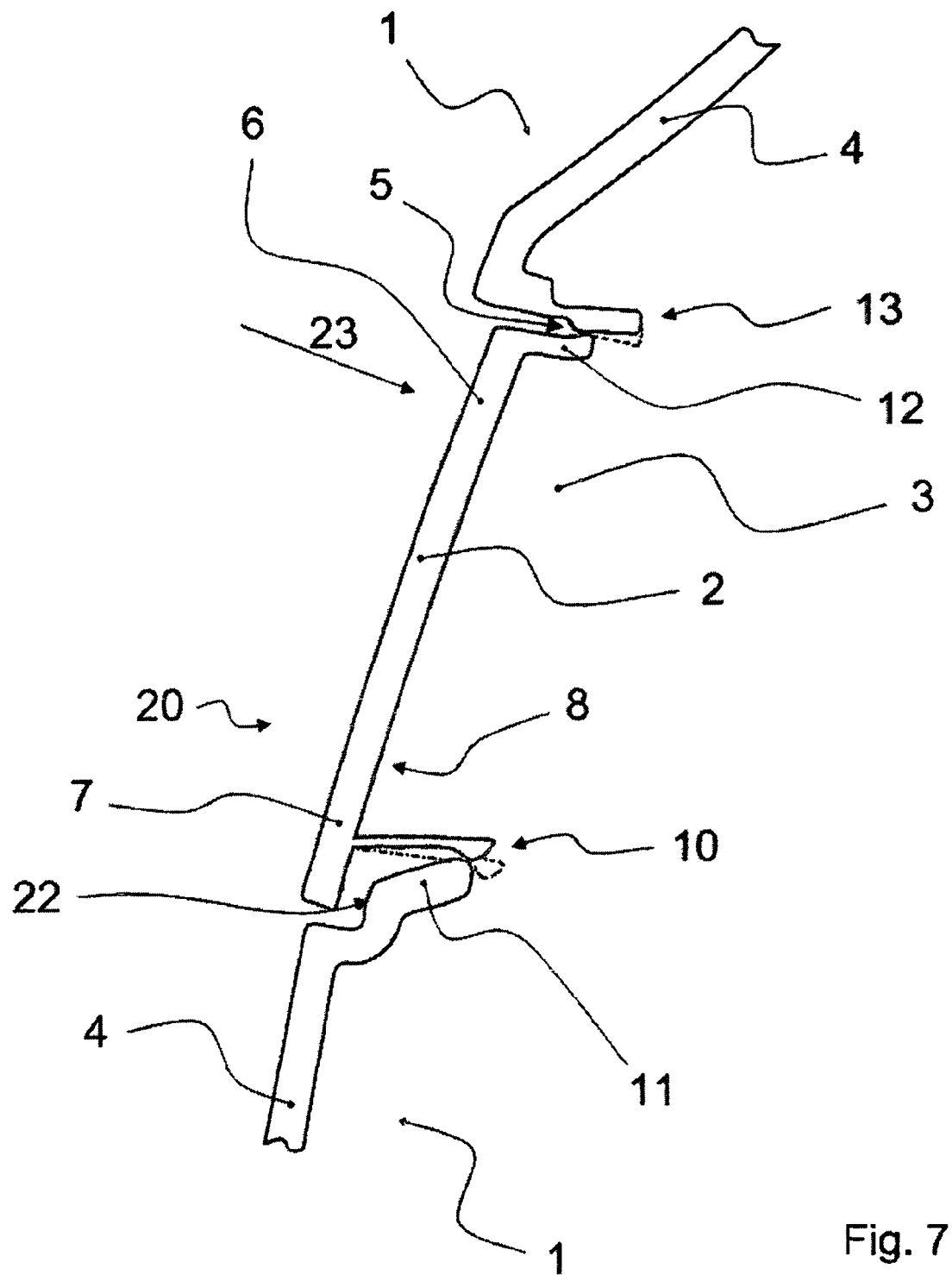
FIG. 7 shows a further sectional view according to FIG. 4 which arises during an opening process.

Following from FIG. 4, FIG. 7 shows a sectional view of the device which has a cover 2 placed in an opening 3 in a wall 4 of a plastic molded part 1. In the closed position illustrated in FIG. 4, the cover 2 is held substantially without prestress with respect to the opening 3. In order to transfer the cover 2 from its closed position into its open position, a pressure force 23 is introduced according to an arrow 23 on the outer side 20 of the cover 2 in the region of the first rim 6 into the cover 2. This can be carried out, for example, by a pressure force 23 applied according to the arrow 23 with a finger of a user of the device. If the pressure force 23 is high enough, the additional detent counter element 13 can yield due to the configuration according to the invention of additional detent element 12 and additional detent counter element 13, and the additional detent element 12 unlatches from the additional detent counter element 13. At the same time, the cover 2 pivots during the opening process in the region of the first rim 6 into the opening 3. The pivoting of the first rim 6 of the cover 2 causes simultaneously a pulling force acting on the detent element 10. Advantageously, the detent element 10 and the additional detent counter element 13 therefore yield together resulting in a higher total required pressure force 23, in particular, in relation to the assembly forces of the cover 2. Since during assembly, only the detent element 10 has to deflect or yield, the assembly of the cover 2 requires a lower force than the disassembly. The detent element 10 and the additional detent element 12 are formed in such a manner that during the opening process or the disassembly of the cover 2, the detent element 10 therefore advantageously unlatches only after or at the same time as the additional detent element 12. FIG. 7 clarifies the process of yielding of additional detent counter element 13 and detent element 10 by illustrating with a dashed line the initial position of additional detent counter element 13 and detent element 10 in the closed position or prior to the opening process. Within the context of the invention, the additional detent element 12 and the detent counter element 11 can also be formed in such a manner that they yield upon application of a pressure force 23 thereby causing the detent element 10 and, respectively, the additional detent element 12 to unlatch. Furthermore, within the context of the invention, detent element 10 and detent counter element 11 as well as additional detent element 12 and additional detent counter element 13 can yield under a sufficient pressure force 23 thereby causing the detent element 10 and, respectively, the additional detent element 12 to unlatch.

REFERENCE LIST

1 Plastic molded part
2 Cover
3 Opening
4 Wall
5 Limit stop
6 First rim
7 Second rim
8 Inner side
9 Retaining hook
10 Detent element
11 Detent counter element
12 Additional detent element
13 Additional detent counter element
14 Centering element
15 Centering counter element
16 Retaining lanyard
17 Clip element
17 Snap element
18 Receptacle
19 Top coat
20 Outer side
21 Spacer
22 Support surface
23, 24 Pressure force

The invention claimed is:

1. A device, comprising
a plastic molded part, in particular a trim part,
comprising a cover for closing an opening in a wall of the plastic molded part,
wherein the cover inserted into the opening can assume a closed position in which it closes the opening and an open position in which it can be removed from the opening and/or can be inserted therein,
wherein the cover has a contour which is substantially formed complementary to the opening so that the cover substantially this the opening in the closed position,
wherein the cover has a first rim and a second rim substantially opposite of the first rim,
wherein the cover has at least one retaining hook which is arranged in the region of the first rim on a cover's inner side facing toward the opening and which engages behind the opening in the closed position of the cover,
wherein the cover further has at least a first detent element which is arranged on the cover's inner side in a region of the second rim and which, in the closed position of the cover, is latched to at least a first detent counter element fixedly attached to the wall,
wherein the cover has a second detent element on the inner side in the region of the first rim, which second detent element interacts with at least a second detent counter element on the wall, and
wherein the cover is held in the closed position at least substantially without prestress with respect to the opening and wherein the device is adapted such that, for assembling the cover, a lower force is required than for disassembling.

2. The device according to claim 1, wherein, in the closed position of the cover, the second detent counter element serves as limit stop for the second detent element.

3. The device according to claim 2, wherein the retaining hook, the first detent element and the second detent element are formed in such a manner that they jointly fix the cover in the closed position with slight play with respect to the wall.

4. The device according to claim 2, wherein the first detent element and the second detent element are formed in such a manner that during an opening process of the cover, the detent element unlatches only after or at the same time as the second detent element.

5. The device according to claim 1, wherein the retaining hook, the first detent element and the second detent element are formed in such a manner that they jointly fix the cover in the closed position with slight play with respect to the wall.

6. The device according to claim 1, wherein the first detent element and the second detent element are formed in such a manner that during an opening process of the cover the detent element unlatches only after or at the same time as the second detent element.

7. The device according to claim 1, wherein the first rim has a plurality of retaining hooks which are preferably arranged equally spaced with respect to each other.

8. The device according to claim 1, wherein on its inner side, the cover additionally has at least one centering element which interacts with the opening.

9. The device according to claim 1, wherein the cover additionally has at least one retaining lanyard molded thereon which can be connected to the wall in a captive manner.

10. The device according to the claim 1, wherein one of a group of elements consisting of the first detent element, the retaining hook, the second detent element, the centering element, and the retaining lanyard is integrally molded on the cover.

11. The device according to claim 1, wherein one of a group of elements consisting of the first detent counter element, the second detent counter element, the centering counter element and the receptacle is integrally molded on the wall of the plastic molded part.

12. The device according to claim 1, wherein the plastic molded part is formed as a bumper trim part or a fender of a motor vehicle.

13. The device according to claim 1, wherein the cover and the plastic molded part have at least one top coat.

14. The device according to claim 13, wherein the top coat has a coating selected from a group of coatings consisting of at least one paint coat, at least one base coat, and at least one primer coat.

15. The device according to claim 1, wherein on its inner side, the cover additionally has at least one centering element which interacts with at least one centering counter element in the region of the opening.

16. The device according to claim 9, wherein at its end facing away from the cover, the retaining lanyard has a clip element or a snap element which interacts with a corresponding receptacle on the wail so as to connect the retaining lanyard to the wall.

17. A motor vehicle having a device comprising
a plastic molded part, in particular a trim part,
comprising a cover for closing an opening in a wall of the plastic molded part, wherein the cover inserted into the opening can assume a closed position in which it closes the opening and an oven position in which it can be removed from the opening and/or can be inserted therein, wherein the cover has a contour which is substantially formed complementary to the opening so that the cover substantially fills the opening in the closed position, wherein the cover has a first rim and a second rim substantially opposite of the first rim, wherein the cover has at least one retaining hook which is arranged in the region of the first rim on a cover's inner side facing toward the opening and which engages behind the opening in the closed position of the cover, wherein the cover further has at least a first detent element which is arranged on the cover's inner side in a region of the second rim and which, in the closed position of the cover, is latched to at least a first detent counter element fixedly attached to the wall, wherein the cover has a second detent element on the inner side in the region of the first rim, which second detent element interacts with at least a second detent counter element on the wall, and wherein the cover is held in the closed position at least substantially without prestress with respect to the opening and wherein the device is adapted such that, for assembling the cover, a lower force is required than for disassembling.

* * * * *

UNITED STATES PATENT AND TRADEMARK OFFICE
CERTIFICATE OF CORRECTION

PATENT NO. : 8,985,661 B2  
APPLICATION NO. : 13/202769  
DATED : March 24, 2015  
INVENTOR(S) : Gerhard Müller et al.

Page 1 of 1

It is certified that error appears in the above-identified patent and that said Letters Patent is hereby corrected as shown below:

In the Claims,

In Col. 8, line 17, replace the phrase "substantially this the opening" with the phrase --substantially fills the opening--.

In Col. 9, line 26, replace the phrase "receptacle on the wail" with the phrase --receptacle on the wall--.

Signed and Sealed this  
Eleventh Day of August, 2015

Michelle K. Lee  
*Director of the United States Patent and Trademark Office*